US007890137B2

(12) United States Patent
Specht

(10) Patent No.: US 7,890,137 B2
(45) Date of Patent: *Feb. 15, 2011

(54) SYSTEMS AND METHODS FOR PROVIDING WIRELESS COMMUNICATIONS FOR DATA AND VOICE COMMUNICATIONS

(75) Inventor: Philip Russell Specht, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,647

(22) Filed: Dec. 28, 2009

(65) Prior Publication Data
US 2010/0103879 A1 Apr. 29, 2010

Related U.S. Application Data

(63) Continuation of application No. 11/075,433, filed on Mar. 7, 2005, now Pat. No. 7,657,284.

(51) Int. Cl.
*H04M 1/00* (2006.01)
(52) U.S. Cl. .................... 455/556.1; 455/554; 455/557; 455/552.1
(58) Field of Classification Search .............. 455/556.1, 455/557, 554.1, 552.1, 554; 370/338
See application file for complete search history.

(56) References Cited

U.S. PATENT DOCUMENTS

| 6,018,657 | A | 1/2000 | Kennedy, III et al. |
| 6,411,802 | B1 | 6/2002 | Cardina et al. |
| 7,002,995 | B2 | 2/2006 | Chow et al. |
| 7,292,844 | B2 | 11/2007 | Dowling et al. |
| 2003/0027521 | A1 | 2/2003 | Yip et al. |
| 2003/0125021 | A1 | 7/2003 | Tell et al. |
| 2008/0274767 | A1 | 11/2008 | Sainton et al. |

OTHER PUBLICATIONS

Omerbashich et al., "Integrated INS/GPS Navigation From a Popular Perspective", Journal of Air Transportation (vol. 7, No. 1) 2002.
Cramer, Michael, "GPS/INS Integration", Photogrammetric Week, Wichmann Verlag, Heidelberg, 1997.
Location Studio 2.1-MLP 3.0.0 Developer's Guide, Openwave Systems, Inc.
EL-Sheimy et al, "The Promise of MEMS to the Navigation Community", Dept of Geomatics Engineering—The University of Calgary, www.insidegnss.com (Mar./Apr. 2007).

*Primary Examiner*—Temica M Beamer
(74) *Attorney, Agent, or Firm*—Parks IP Law LLC; Mickki D. Murray, Esq.

(57) ABSTRACT

A wireless communications system that provides communication for a plurality of communication devices. The wireless communications system includes an interface including a local exchange carrier (LEC) connection port, a subscriber connection port and a wireless connection port. The wireless communications system includes a wireless terminal connected to the interface that provides wireless data and voice connectivity over a wireless network.

20 Claims, 4 Drawing Sheets

DSL Configuration

SYSTEMS AND METHODS FOR PROVIDING WIRELESS COMMUNICATIONS FOR DATA AND VOICE COMMUNICATIONS

CROSS-REFERENCE TO RELATED APPLICATIONS

This application is a continuation of U.S. application Ser. No. 11/075,433, filed Mar. 7, 2005, now U.S. Pat. No. 7,657,284, the entirety of which is hereby incorporated by reference.

BACKGROUND OF THE INVENTION

1. Field of the Invention

The present invention relates in general to data and voice communications in a wireless environment, and in particular, to providing a wireless replacement terminal for data and voice applications provided by a service provider for home and small business wired communications.

2. Description of the Related Art

The use of fast Internet connections has grown rapidly over the recent few years. As more people buy home and office computers and create home or office networks, the demand for versatile broadband high-speed connections steadily increases.

When a user requires voice and data applications, such as by connecting to the Internet, they might connect through a dial-up modem, a local-area-network (LAN) connection in their office, through a cable modem, or through a digital subscriber line (DSL) connection, as shown in FIG. 4. A DSL connection (and several variations on DSL technology, e.g., ADSL, HDSL, ISDL, MSDSL, RADSL, SDSL, VDSL, VoDSL and the like) has numerous advantages over the above-mentioned methods.

For example, using a DSL connection, an Internet connection may be left open while a phone line is simultaneously used for voice calls. DSL is a very high-speed connection that uses the same wires as a regular telephone line, so little additional hardware is required. However, the main disadvantage to DSL is that the service is not available everywhere and it is limited by a wire-line connection, as shown in FIG. 6.

There have been attempts to solve this problem. However, no complete solution is available that offers static and dynamic host configuration protocol (DHCP) over wireless facilities to a customer's location that could directly (or indirectly via 802.11, Bluetooth, or the like) connect to service providers using wireless facilities. Other attempts to solve this problem have been attempted but require point-to-point connectivity and do not permit connectivity to the public switch telephone network (PSTN). These conventional solutions are limited by range, topography and do not facilitate the use of dial tones.

Consequently, there is a need to provide broadband service to remote areas where a regular telephone line may not be available. A new housing development and/or a home not wired for broadband facilities may benefit from a wireless terminal which includes both data and voice applications capabilities.

SUMMARY OF THE INVENTION

An object of the invention is to provide systems and methods that provide a wireless communications system including a wireless terminal for data and voice broadband applications for home and small business wired communications.

The wireless communications system provides communication for a plurality of communication devices. The wireless communications system includes an interface including a local exchange carrier (LEC) connection port, a subscriber connection port and a wireless connection port. The wireless communications system includes a wireless terminal connected to the interface that provides wireless data and voice connectivity over a wireless network.

The wireless communications system may be implemented as a stand alone device or a backup for conventional land-line systems. The wireless communications system includes a processor, a data transmission portion and a voice transmission portion. The data transmission portion includes a data connectivity device, a maintenance device and a router. The voice transmission portion includes a wireless device, a voice interface adapter and a ringing generator to simulate an incoming call ringing tone.

The wireless terminal may be provided as a direct replacement for, or to augment, conventional wire-line broadband facilities that are currently implemented into businesses or homes.

In accordance with systems and methods of this invention, subscriber's now have a wireless alternative to existing wire-line services. Remote customers now have the option to subscribe to broadband services in locations where an Internet service provider may not offer broadband services.

In accordance with another aspect of this invention, a method is provided that provides wireless data and voice connectivity over a wireless network for a plurality of communication devices. The method includes providing an interface including a local exchange carrier (LEC) connection port, a subscriber connection port and a wireless connection port. The subscriber connection port is connected to the wireless connection port, and a wireless terminal is connected to the wireless connection port in the interface.

The present invention addresses the shortcomings identified above by providing a wireless terminal in a wireless communications system for wire-line facilities that provide broadband transmission of data and voice in accordance with systems and methods of this invention.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

This invention overcomes the conventional problems described above by providing wireless broadband data and voice connectivity. Particular embodiments of the present invention will now be described in greater detail with reference to the figures.

Figure 1:
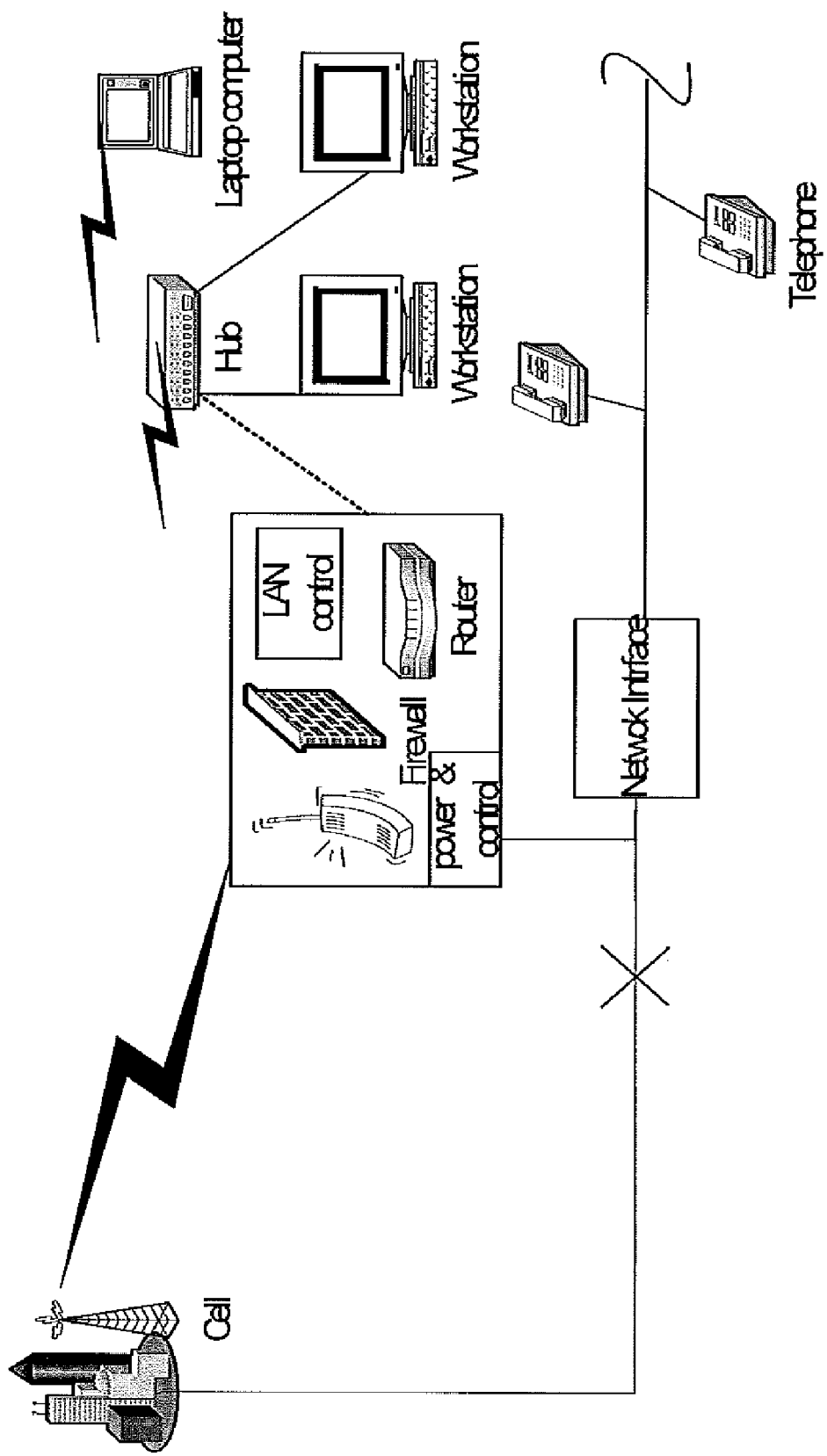
FIG. 1 is an exemplary functional diagram of a wireless communication system in accordance with systems and methods of this invention.

FIG. 1 shows an exemplary diagram of a wireless communications system 10 for home and business wired communications that provides wireless broadband data and voice connectivity. Implementations of the wireless communications system 10 may be ideal for remote and temporary locations, such as a trailer at a building site, a kiosk in a shopping mall, at a flee market, and/or any other location that would require instant connectivity where wire-line connectivity may not be immediately available.

The wireless communications system 10 includes a wireless terminal 12 that provides the broadband connectivity for voice and data. The wireless terminal 12 may include all of the same types of services that a commercially available DSL service or a cable modem service could provide. However, instead of using conventional wire-line facilities (such as shown by reference 34 of the wire line path in FIG. 4), no wires are necessary to connect from the wireless terminal 12 to a cellular station 14 over a wire line network 19.

As shown in FIG. 1, it is no longer necessary (B) to provide a wire-line connection 14 (such as a DSL line) from a network interface 13 to a Local Exchange carrier's (LEC) communications facilities 15 (or central office (CO)). Instead, the wireless terminal 12 may be connected to the network interface 13 at the home or office. As such, one or more telephones 16 may be connected to the wireless communications system 10 via the network interface 13.

FIG. 1 also shows that various workstations 17 may be connected with a hub 18 directly to the wireless terminal 12. The workstations 17 may be wired 37 and/or wirelessly connected 38 through the hub 18 to the wireless terminal 12. Although not shown, it is also possible to incorporate a private branch exchange (PBX) with the wireless communications system 10 so that an end to end connection may be made to facilitate a number of phone connections to the wireless communications system 10.

As with conventional wireless mobile devices, the wireless communications system 10 includes a cellular station 14 that operates over the wireless network 19, such as a cellular wireless network. The wireless network 19 may operate in accordance with a variety of commercially available technology network system protocols, including for example, TDMA, GSM, CDMA, UMTS, GPRS, PBX or any other technology network system now known or later developed. Those skilled in the art will appreciate that the present invention may be implemented in various other wireless and radio frequency data transmission systems, including networks utilizing EDGE, FDMA, WCDMA, OFDM, and similar communications protocols.

According to systems and methods of this invention, it is evident that many alternatives, modifications and variations of the components parts described in this invention can be rearranged and will be apparent to those skilled in the art. Various changes may be made without departing from the spirit and scope of the invention, such as incorporating more than one network interface 13, adapting the wireless terminal 12 to receive various types of now known or later developed wireless devices, such as a PDA, a facsimile, data communication devices, telephones and the like.

Figure 2:
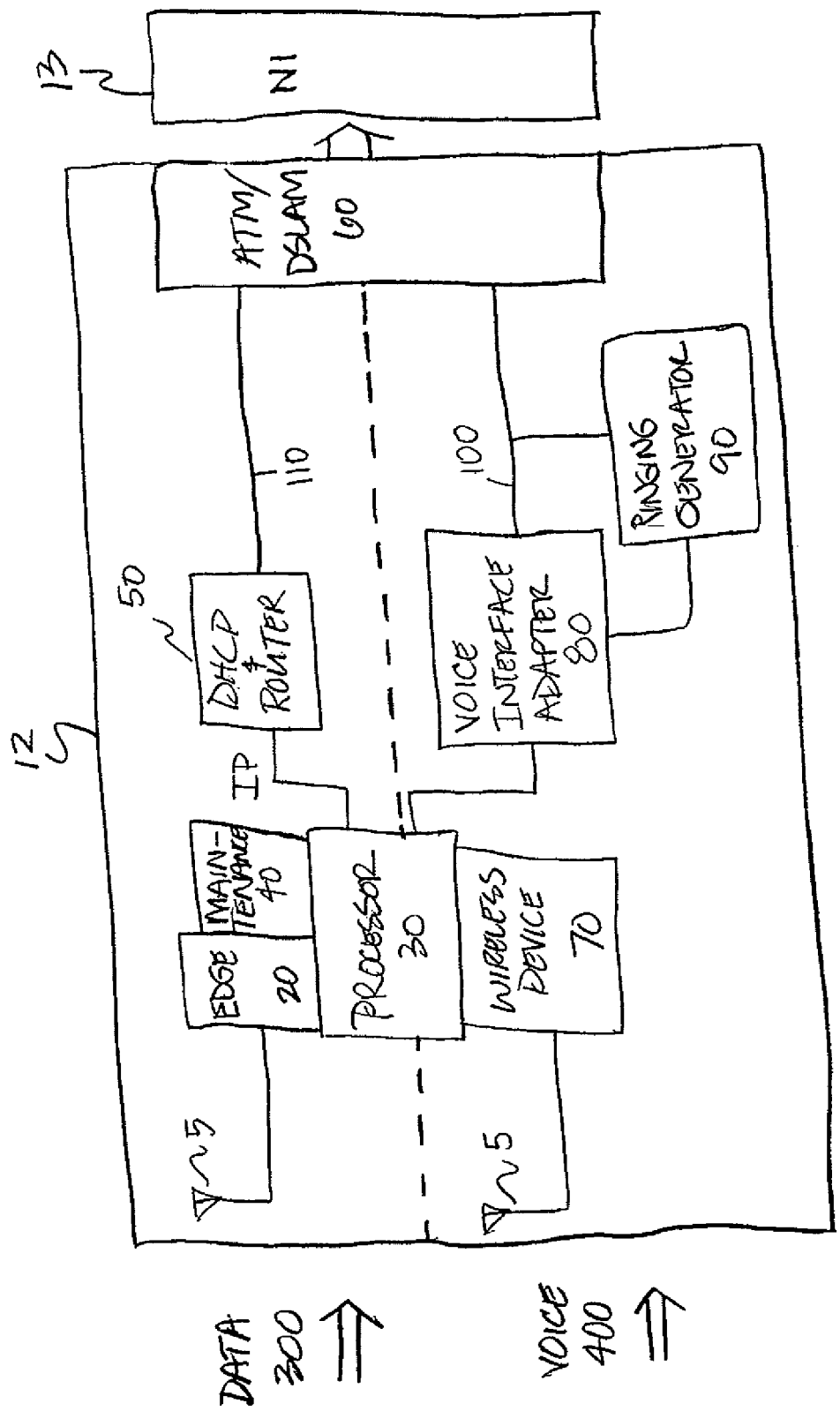
FIG. 2 is an exemplary functional diagram of a wireless terminal in the wireless communication system in accordance with systems and methods of this invention.

FIG. 2 illustrates an exemplary configuration for the wireless terminal 12. The wireless terminal 12 serves as a modem having wireless capabilities to transmit both voice and data transmissions.

The wireless terminal 12 includes all of the circuitry that would mimic the LEC communications facilities (or CO), such as subscriber loop circuitry (SLC) to connect a telephone company's CO to a demarcation point, or the network interface 13 at a customer's premise. The wireless terminal 12 meets all standard two-wire and four-wire PBX and CO interface requirements. The subscriber loop carrier equipment may include cable, digital subscriber line modem circuits, interfaces, dial tone and ringing generator supplies and the like.

The wireless terminal 12 may be incorporated with various known components, such as a firewall, various routers, dynamic host controller protocol (DHCP), and connectivity via a processor to provide all of the services that are needed. Various services may also be provided by the wireless terminal 12, such as routing services, masquerading for address translation, DHCP for addressing, and other services now known or later developed.

Figure 6:
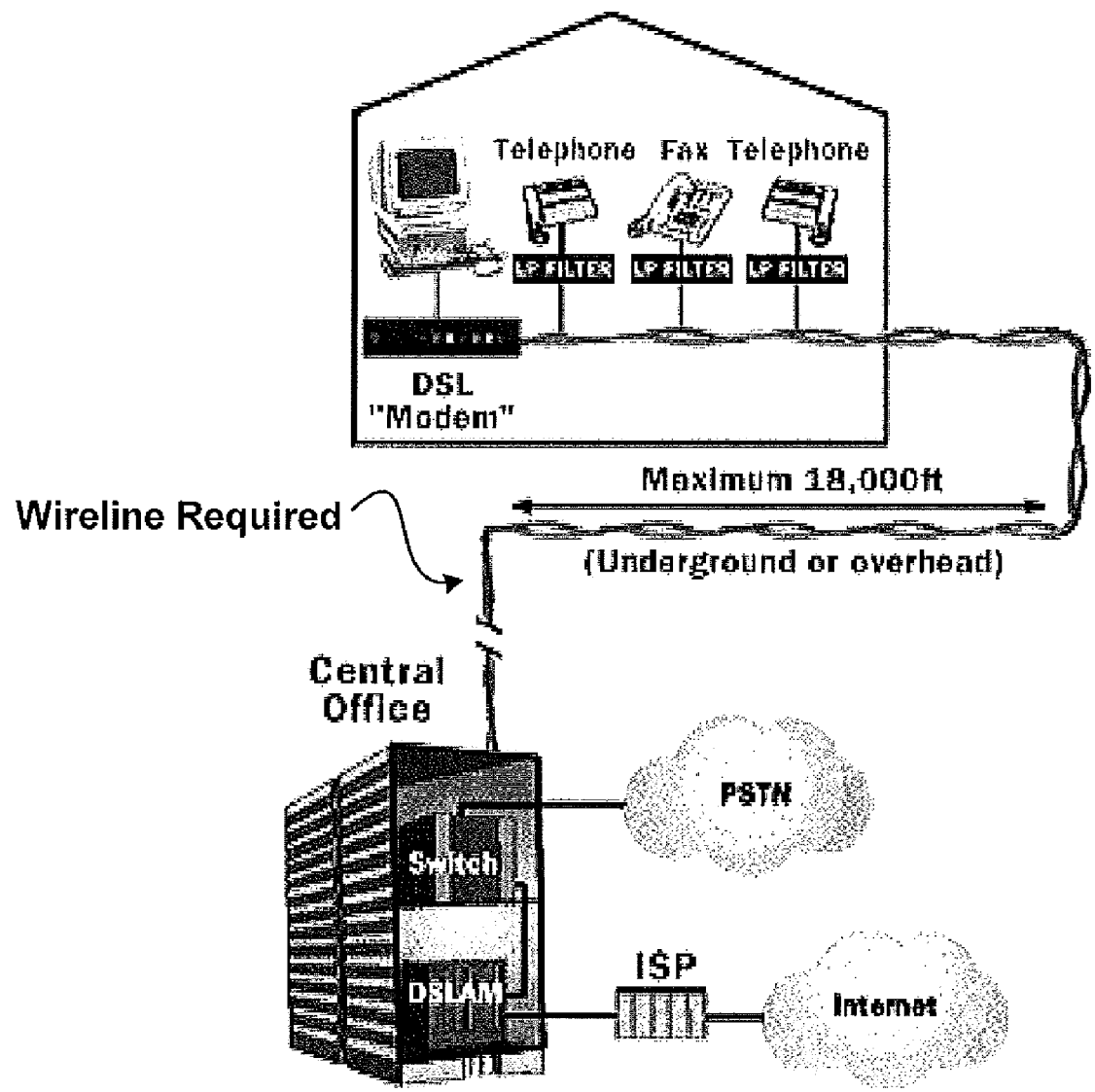
FIG. 6 is an exemplary illustration of a DSL configuration.

The wireless terminal 12 serves as the connectivity to and from the cellular station 14 and the network interface 13. The wireless terminal 12 may include additional network components that would be similar to a DSL wire-line system, such as shown is FIGS. 1 and 6, including a firewall, a router, power and control and all other components that are encompassed in a wire-line broadband service coming up to a network interface 13 on a two-wire and/or a four-wire network.

The wireless communications system 10 may operate in a home or an office a variety of different ways. That is, the wireless terminal 12 may serve as a stand alone wireless communications system. Alternatively, the wireless terminal 12 may be combined with and provided to augment another service, such as a wire-line service (e.g., DSL or cable), and/or even as a backup system to the wire-line system.

For example, the wireless communications system 10 may be incorporated to augment a wire-line service facility such that if the connectivity from the wire-line service facility fails, the wireless communications system 10 can alternatively provide backup wireless connectivity. According to this embodiment, it is possible to provide broadband facilities without going through a subscriber loop interface.

According to systems and methods of this invention, the wireless terminal 12 can functionally replace all wire-line facilities (such as the wire-line DSL system shown in FIG. 6) up to a network interface 13 located at a home or a business. As shown in FIG. 2, the wireless terminal 12 includes a data transmission portion 300 and a voice transmission portion 400.

Data Connectivity Portion

The data transmission portion 300 of the wireless terminal 12 includes an antenna 5 for sending and receiving signals to and from the cellular station 14 under the control of a processor 30 provided within the wireless terminal 12. The processor 30 may be equipped with a wireless data connectivity device 20 that communicates data across the wireless terminal 12 connected to a local access network (LAN). The wireless data connectivity device 20 may be implemented as a smart card attached to the processor 30 of the wireless terminal 12. The wireless data connectivity device 20 may operate over a wireless network in accordance with at least one of various data and voice connect services, such as for example, as an EDGE card, a 3G capable card, 2G-½, GPRS, UMTS and/or any other similar connect service now known or later developed that is capable of transmitting data. In the alternative to a smart card, the wireless data connectivity may be implemented as part of circuitry in the processor 30. Furthermore, a maintenance device 40 may be implemented with the processor 30 to provide various types of functionality, such as providing a software package that provides router/firewall/DHCP/Masquerading and router functionality.

The processor 30 may be implemented on a programmed general purpose computer. The processor 30 may also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like.

The processor 30 may be implemented using any appropriate combination of alterable, volatile or non-volatile memory or non-alterable, or fixed, memory. The alterable memory, whether volatile or non-volatile, may be implemented using any one or more of static or dynamic RAM, a floppy disk and disk drive, a write-able or rewrite-able optical disk and disk drive, a hard drive, flash memory or the like. Similarly, the non-alterable or fixed memory may be implemented using any one or more of ROM, PROM, EPROM, EEPROM, an optical ROM disk, such as a CD-ROM or DVD-ROM disk, and disk drive or the like.

Although numerous variations are possible, according to systems and methods of this invention, the data transmission portion 300 may be connected by a router 50 (and/or DHCP) through a local access network (LAN) 110 connection into a demarcation point and/or interconnection between telephone company communications facilities and the subscriber's premises.

Figure 3:
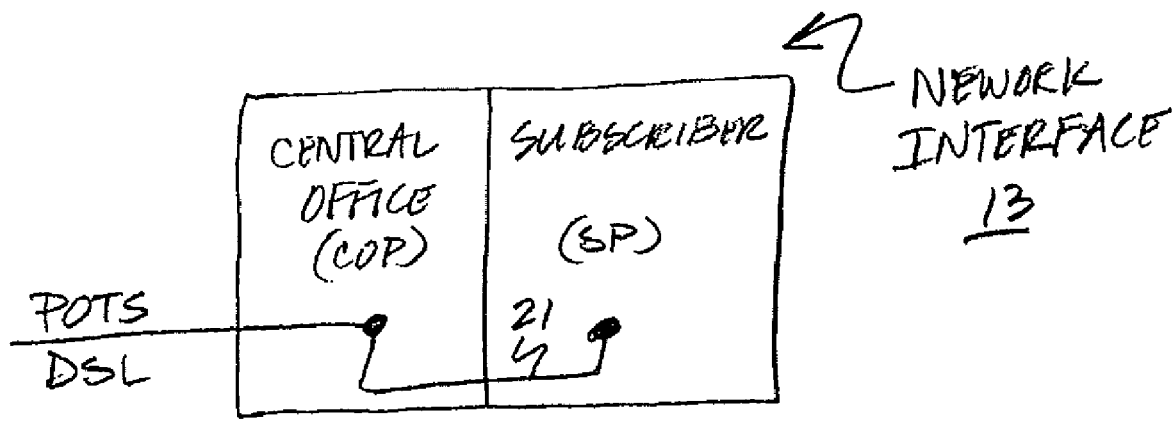
FIG. 3 is an exemplary diagram of a network interface.

As shown in FIG. 2, the network interface 13 is provided at the subscriber's premises and defines the demarcation point for the carrier and the subscriber. FIG. 3 shows an exemplary illustration of the network interface 13 which may be provided to bring in the POTS/DSL line and/or a broadband service provider (or the like) from a carrier.

Figure 4:
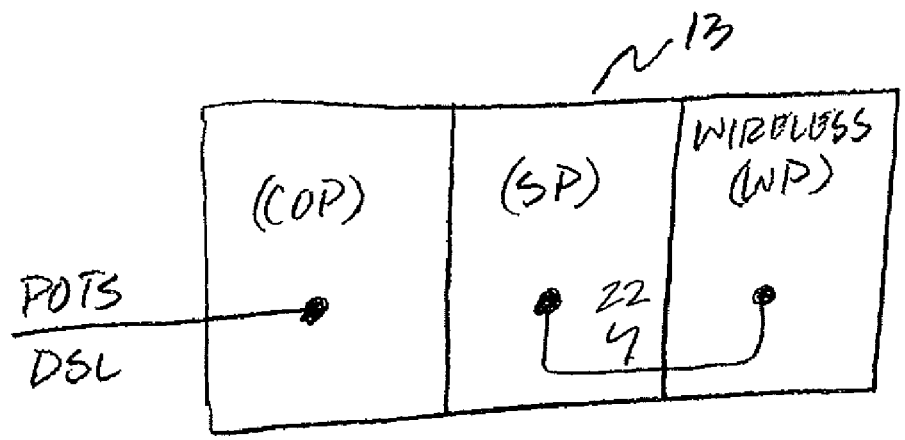
FIG. 4 is an exemplary diagram of a network interface in accordance with this invention.
Figure 5:
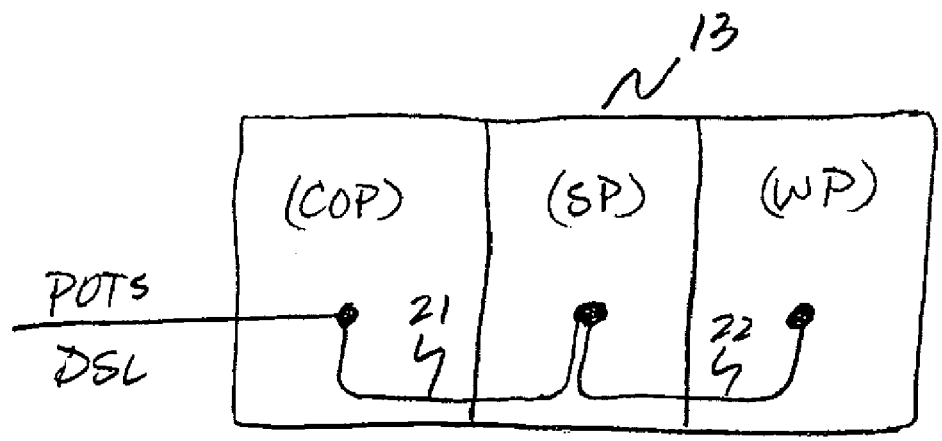
FIG. 5 is an exemplary diagram of a network interface in accordance with this invention.

As shown in FIG. 3, a cable 21 is generally connected from the subscriber portion (SP) of the network interface 13 to a central office portion (COP) of the network interface 13 through which the POTS line is connected. However, in accordance with this invention, FIG. 4 illustrates a cable 22 may be connected from the subscriber portion (SP) of the network interface 13 to a wireless portion (WP). The wireless portion (WP) on the network interface 13 is the location where the wireless terminal 12 may be attached so that the subscriber may receive data and voice connectivity from the wireless terminal 12 of the wireless communications system 10. The central office portion (COP) of the network interface 13 is unaffected. It is understood that the wireless terminal 12 may serve as a stand alone broadband system (as shown in FIG. 4) to the subscriber and/or the wireless terminal 12 may be provided to augment, or as a backup, for another wire-line broadband service wireless portion (WP) as shown in FIG. 5. As such, the subscriber portion (SP) of the network interface 13 may be connected to the central office portion (COP) by a first cable 21 and to the wireless portion (WP) by a second cable 22.

Referring back to FIG. 2, a digital subscriber line access multiplexer 60 (DSLAM), or asynchronous transfer mode (ATM), or similar, may be provided as part of the wireless terminal 12 to provide connectivity to the wireless portion (WP) of the network interface 13. In an integrated voice/data application, the digital subscriber line multiplexer (DSLAM) 60 or ATM multiplexes the data and voice packets from the customer and transmits the packets over one or more high-speed circuits. The voice packets are forwarded to the public switched telephone network (PSTN), or perhaps an IP voice network, and the data packets are forwarded to the Internet, often over an ATM-based data network.

According to another aspect of the invention, provisioning and maintenance may be accessible over the wireless network 19, for example through either Short Messaging Service (SMS) or Unstructured Supplementary Services Data (USSD).

The data transmission portion 300 of FIG. 2 between router 50 and the network interface 13 may be optional. In particular, this invention may be simplified by reducing the number of components on the data transmission portion 300 to a basic set of core components which combine certain distinct elements, for example, the filters, modems, etc.

Voice Connectivity Portion

FIG. 2 also shows an exemplary illustration of the voice transmission portion 400 of the wireless terminal 12.

The voice transmission portion 400 of the wireless terminal 12 may be connected to the processor 30 and also includes an antenna 5 that allows a wireless device 70 (such as a device that includes the mobile circuitry/technology of a mobile phone) to communicate voice signals to and from the wireless terminal 12 and the cellular station 14 over the wireless network 19. In FIG. 2, the wireless device 70 is connected with a voice interface adapter 80 and a ringing generator 90.

Voice connectivity is provided by the voice interface adapter 80 and the ringing generator 90. The voice interface adapter 80 is combined with the ringing generator 90 for simulating a ringing tone for the wireless device 70 when incoming calls are received by the wireless communications system. The ringing generator 90 may, for example, provide audio at a superimposed ringing current voltage of ±105V @ 20 Hz. over 48V talk battery.

The voice interface adapter 80 provides the dialing digit capabilities (e.g., DTMF) for dialing an outgoing call from wireless device 70 of the wireless terminal 12. The voice interface adapter 80 also provides simplexing the ring generator onto a two-wire (or four-wire) circuit that would resemble a plain old telephone (POTS) line into a house so that a phone coupled to the voice transmission portion 400 circuit rings just like a phone that was plugged into a wire-line facility from a CO.

Similar to conventional DSL lines, at the interface, the wireless terminal 12 may include a pair of wires that originate within the wireless terminal 12 and extend to the customer's network interface 13 as with a POTS line. The voice and data may be simplexed on the wires for the wireless broadband wireless terminal 12. In order to separate the data from the voice information being transmitted across the pairs of wires, a filter may be provided that separates the voice and the data apart so that the data transmission portion 300 may be coupled to a modem. The voice transmission portion 400 may be provided with filters so that the broadband carrier may be filtered from the voice. As such, the data transmission portion 300 would resemble a voice line from a POTS line.

The network components in the voice transmission portion 400 of FIG. 2 between the voice interface adapter 80 and the network interface 13 are optional. Their functionality, including circuitry, software and hardware may be incorporated into other components in the wireless terminal 12.

A number of various wireless communication devices may be used in accordance with systems and methods of this invention, such as for example, a cellular phone, a PDA, an SMS device, an MMS device, and/or any other communications device now known or later developed.

Operation

In operation, when there is little or no activity, the wireless communications system 10 may operate in an idle mode. That is, an idle mode would be a state in which little activity is occurring because the subscriber is not presently making any data or voice requests, such as where the subscriber makes a phone call, requests a web page or email.

When a subscriber desires to make a phone call from the home or office, the subscriber will receive a dial tone when she lifts the receiver. In response, the subscriber may enter the number to be called for a particular destination. When the last number is received, a request may be transmitted over the wireless network 19 back to a CO 15 to initiate a call. The call would be set up and established over the wireless network 19 from the subscriber to the party called in a manner that is similar to other cellular calls made with a mobile phone that is presently known or later developed in accordance with systems and methods of this invention.

Similarly, a request for a data session application (such as a request for recalling a web page) may be initiated when a particular button (like clicking on a "Go" button on a search engine) is selected to request information from the Internet. At that time, the router 50 may be activated and may activate other supporting services (such as with GPRS) necessary for establishing the data session connection. The data session connection may be set up and established over the wireless network 19 from the subscriber to the destination address in a manner that is similar to other data session connections procedures that are presently known or later developed in accordance with systems and methods of this invention.

The wireless communications system 10 may incorporate a time-out feature (perhaps by integrating timers) for use when a request for services is not performed within a predetermined period of time. When the predetermined period of time is reached and the particular request for either data or voice has not been completed, the wireless communications system 10 may time out and proceed into an idle state. Appropriate messages may be sent back to the subscriber informing the subscriber of the status of the attempted request for service.

When an incoming call is transmitted to the subscriber, the wireless device 70 may send a request to the voice interface adapter 80 to audibly ring the subscriber via the ringing generator 90. At least one phone connected to the wireless terminal 12 would ring to notify the subscriber of the incoming call. The wireless terminal 12 may be provided with as much intelligence as a CO in that certain available applications could also be integrated, such as caller ID, call forwarding and the like. The wireless route that the incoming call would take may be completely transparent to the subscriber and she may not be able to distinguish the difference between the call coming in from the wireless communications system 10 and an incoming call connection made by a POTS line.

Billing may be implemented and tracked in a variety of different ways which are now know or later developed in accordance with systems and methods of this invention.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A system for providing voice communications and data communications received from a wireless communications network to a plurality of communications devices, the system comprising:
    a wireless terminal being in wireless communication with a cellular station of the wireless communications network; and
    a network interface coupled to the wireless terminal, wherein:
        the network interface includes a voice device connection port and a data device connection port;
        the network interface is configured to receive the voice communications and the data communications from the wireless terminal;
        the network interface is configured to provide the voice communications received from the wireless terminal to the voice device connection port;
        the network interface is configured to provide the data communications received from the wireless terminal to the data device connection port;
        the voice device connection port is configured to allow a voice device to be physically coupled to the network interface by way of the voice device connection port; and
        the data device connection port is configured to allow a data device to be physically coupled to the network interface by way of the data device connection port.

2. The system of claim 1, wherein the voice device connection port of the network interface includes a telephone jack.

3. The system of claim 1, wherein the data device connection port of the network interface includes an Ethernet jack.

4. The system of claim 1, wherein the data device connection port of the network interface includes a digital subscriber line (DSL) hardware port.

5. The system of claim 1, wherein the network interface further comprises a wireless device connection port.

6. The system of claim 5, wherein the network interface further comprises a wireless router in communication with the wireless device connection port.

7. The system of claim 1, wherein the network interface is a backup subsystem for a wire-line connection, whereby call flow is routed through the network interface from/to the wireless communications network if call flow through the wire-line connection is interrupted.

8. The system of claim 1, wherein the wireless terminal includes a voice transmission portion for sending/receiving voice communications to/from a cellular station of the wireless communications network, the voice transmission portion comprising:
    a voice transmissions antenna for sending/receiving voice communications to/from the cellular station of the wireless communications network; and
    a wireless voice connectivity device connected to the voice transmissions antenna for providing/receiving voice communications to/from the wireless communications network by way of the voice transmissions antenna and configured to provide voice communications received from the voice transmissions antenna to the network interface for delivery to the plurality of communication devices.

9. The system of claim 1, wherein the wireless terminal includes a data transmission portion for sending/receiving data communications to/from a cellular station of the wireless communications network, the data transmission portion comprising:
    a data transmissions antenna for sending/receiving data communications to/from the cellular station of the wireless communications network; and
    a wireless data connectivity device connected to the data transmissions antenna for providing/receiving data communications to/from the wireless communications network by way of the data transmissions antenna and configured to provide data communications received from the data transmissions antenna to the network interface for delivery to the plurality of communication devices.

10. The system of claim 9, wherein:
the data transmission portion further includes an intermediate device connected to the wireless data connectivity device for receiving the data communications from the wireless data connectivity device; and
the intermediate device is selected from the group of intermediate devices consisting of a router and a dynamic host configuration protocol (DHCP).

11. A wireless terminal for providing voice communications and data communications received from a wireless communications network to a plurality of communications devices, the terminal comprising:
a data transmission portion for sending/receiving data communications to/from a cellular station of the wireless communications network, the data transmission portion including:
a data transmissions antenna for sending/receiving data communications to/from a cellular station of the wireless communications network; and
a wireless data connectivity device connected to the data transmissions antenna for providing/receiving data communications to/from the wireless communications network by way of the data transmissions antenna and configured to provide data communications received from the data transmissions antenna to the network interface for delivery to the plurality of communication devices; and
a voice transmission portion for sending/receiving voice communications to/from a cellular station of the wireless communications network, the voice transmission portion including:
a voice transmissions antenna for sending/receiving voice communications to/from the cellular station of the wireless communications network; and
a wireless voice connectivity device connected to the voice transmission antenna for providing/receiving voice communications to/from the wireless communications network by way of the voice transmissions antenna and configured to provide voice communications received from the voice transmissions antenna to the network interface for delivery to the plurality of communication devices.

12. The wireless terminal of claim 11, wherein the data transmission antenna and the voice transmission antenna are the same.

13. The wireless terminal of claim 11, further comprising a processor, the processor including the wireless data connectivity device and the wireless voice connectivity device.

14. The wireless terminal of claim 11, wherein the wireless data connectivity device is selected from the group of wireless connectivity devices consisting of a digital subscriber line multiplexer (DSLAM) device and an asynchronous transfer mode (ATM) device.

15. The wireless terminal of claim 11, wherein:
the data transmission portion further includes an intermediate device connected to the wireless data connectivity device for receiving the data communications from the wireless data connectivity device; and
the intermediate device is selected from the group of intermediate devices consisting of a router and a dynamic host configuration protocol (DHCP).

16. A method for providing voice communications and data communications to a plurality of communications devices, the method comprising:
a wireless terminal receiving voice communications and data communications from a cellular station of a wireless communications network;
a network interface, having a voice device connection port and a data device connection port, receiving the voice communications and the data communications from the wireless terminal;
the network interface providing the voice communications received from the wireless terminal to a voice device physically coupled to the network interface by way of the voice device connection port; and
the network interface providing the data communications received from the wireless terminal to a data device physically coupled to the network interface by way of the data device connection port.

17. The method of claim 16, wherein:
the wireless terminal receiving voice communications from the cellular station of the wireless communications network includes the wireless terminal receiving voice communications via a voice transmission portion of the wireless terminal;
the voice transmission portion has a voice transmission antenna receiving the voice communications from the cellular station; and
the voice transmission portion has a wireless voice connectivity device receiving the voice communications from the voice transmission antenna.

18. The method of claim 16, wherein:
the wireless terminal receiving data communications from the cellular station of the wireless communications network includes the wireless terminal receiving data communications via a data transmission portion of the wireless terminal;
the data transmission portion has a data transmission antenna receiving the data communications from the cellular station; and
the data transmission portion has a wireless data connectivity device receiving the data communications from the data transmission antenna.

19. The method of claim 18, further comprising:
the wireless terminal providing the data communications received from the cellular station of the wireless communications network to the network interface, including:
an intermediate device of the wireless terminal receiving the data communications from the wireless data connectivity device for providing the data communications to the network interface;
wherein the intermediate device is selected from the group of intermediate devices consisting of a router and a dynamic host configuration protocol (DHCP).

20. The method of claim 16, wherein the network interface operates as a backup subsystem for a wire-line connection, whereby call flow is routed through the network interface from/to the wireless communications network if call flow through the wire-line connection is interrupted.

* * * * *